(12) United States Patent
Kuninobu et al.

(10) Patent No.: US 9,063,527 B2
(45) Date of Patent: Jun. 23, 2015

(54) SCHEDULING DEVICE AND METHOD THEREFOR

(75) Inventors: Shigeta Kuninobu, Yokohama (JP); Yusuke Kuroki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 470 days.

(21) Appl. No.: 13/617,445

(22) Filed: Sep. 14, 2012

(65) Prior Publication Data

US 2013/0253680 A1 Sep. 26, 2013

(30) Foreign Application Priority Data

Mar. 22, 2012 (JP) ................................ 2012-066035

(51) Int. Cl.
*G06F 19/00* (2011.01)
*G05B 19/02* (2006.01)
*G05B 19/418* (2006.01)

(52) U.S. Cl.
CPC ...... *G05B 19/02* (2013.01); *G05B 2219/32077* (2013.01); *G05B 2219/32078* (2013.01); *G05B 2219/32306* (2013.01); *G05B 19/41865* (2013.01); *G05B 2219/31378* (2013.01); *G05B 2219/31386* (2013.01); *G05B 2219/32243* (2013.01); *G05B 2219/32305* (2013.01)

(58) Field of Classification Search
CPC ........... G05B 2219/25419; G05B 2219/32077; G05B 2219/32078; G05B 2219/32306
USPC ........................................... 700/95, 100, 101
See application file for complete search history.

(56) References Cited

U.S. PATENT DOCUMENTS

| | | | | |
|---|---|---|---|---|
| 5,155,679 A | * | 10/1992 | Jain et al. ........................ | 700/106 |
| 5,202,836 A | * | 4/1993 | Iida et al. ........................ | 700/101 |
| 5,237,508 A | * | 8/1993 | Furukawa et al. ............. | 700/100 |
| 5,495,430 A | * | 2/1996 | Matsunari et al. ................. | 703/6 |
| 5,506,783 A | * | 4/1996 | Tanaka et al. .................. | 700/101 |
| 5,586,021 A | * | 12/1996 | Fargher et al. ................. | 700/100 |
| 6,463,346 B1 | * | 10/2002 | Flockhart et al. ............. | 700/102 |

(Continued)

FOREIGN PATENT DOCUMENTS

| | | |
|---|---|---|
| JP | 9-183044 A | 7/1997 |
| JP | 9-282375 A | 10/1997 |
| JP | 2010-157182 | 7/2010 |

OTHER PUBLICATIONS

Office Action issued Apr. 8, 2014, in Japanese Patent Application No. 2012-066035 with English translation.

*Primary Examiner* — Ronald Hartman, Jr.

(74) *Attorney, Agent, or Firm* — Oblon, McClelland, Maier & Neustadt, L.L.P.

(57) ABSTRACT

There is provided a scheduling device in which a dividing unit selects a predetermined number of semi-finished products from a head out of a semi-finished products for which scheduling order was determined, and divides selected semi-finished products according to a plurality of patterns to generate a plurality of set sequences, the set sequences each being a sequence of one or more sets each including at least one semi-finished product; a calculating unit assigns, for each of the set sequences, the sets included in the set sequence to different ones of the processing devices so that processing of all the semi-finished products are completed fastest, and finds the set sequence that completion time is completed fastest among the set sequences; and a determining unit determines that a top set in the set sequence found by the calculating unit is processed by the processing device assigned thereto.

10 Claims, 3 Drawing Sheets

(56) References Cited

U.S. PATENT DOCUMENTS

| | | |
|---|---|---|
| 7,010,373 B2* | 3/2006 | Fukushima et al. .......... 700/100 |
| 7,415,316 B2* | 8/2008 | Quarg ........................... 700/100 |
| 7,676,293 B2* | 3/2010 | Yaji et al. ..................... 700/100 |
| 7,908,127 B2* | 3/2011 | Weigang et al. ................. 703/6 |
| 8,126,588 B2* | 2/2012 | Schmidt et al. ............... 700/228 |
| 8,185,226 B2* | 5/2012 | Weigang et al. .............. 700/101 |
| 8,452,437 B2* | 5/2013 | Burda et al. .................. 700/101 |
| 2006/0015203 A1* | 1/2006 | Fukushima et al. .......... 700/100 |
| 2008/0082199 A1* | 4/2008 | Hama et al. ................... 700/149 |
| 2011/0238537 A1* | 9/2011 | Wilson et al. ................... 705/29 |

\* cited by examiner

US 9,063,527 B2

SCHEDULING DEVICE AND METHOD THEREFOR

CROSS REFERENCE TO RELATED APPLICATIONS

This application is based upon and claims the benefit of priority from the prior Japanese Patent Application No. 2012-66035, filed on Mar. 22, 2012, the entire contents of which are incorporated herein by reference.

FIELD

An embodiment described herein relates to a scheduling device for a plurality of processing devices each capable of processing one or more semi-finished products at one time, and a method therefor.

BACKGROUND

A simplest way of automatically scheduling the processing of semi-finished products is to assign the semi-finished products one by one to a processing device which completes processing fastest. However, when a batch processing device which can collectively (i.e., at one time) process a plurality of semi-finished products is used as such a processing device, it is necessary to consider collectively a plurality of the semi-finished products to be assigned to the device in order to achieve scheduling with sufficient production efficiency.

When plenty of semi-finished products are ready, high production efficiency is achieved by constantly applying the maximum processible number of semi-finished products to the batch processing device.

However, when the semi-finished products are arriving at a sufficiently slow pace as compared with their processing time in the processing device for the reason that production of the semi-finished product takes time, better production efficiency is achieved in some cases by starting the processing before the maximum number of semi-finished products processible by the batch processing device is ready.

Conventionally, how many semi-finished products are collectively applied to the batch processing device has been determined by person's experience and intuition. However, it takes much time for preparing a production schedule and it is also difficult to work out a schedule with sufficient production efficiently.

DETAILED DESCRIPTION

There is provided with a scheduling device that schedules processing of a plurality of semi-finished products by a plurality of processing devices, including: a dividing unit, a calculating unit and a determining unit.

The dividing unit selects a predetermined number of semi-finished products from a head out of a plurality of the semi-finished products for which scheduling order was determined, and divides selected semi-finished products according to a plurality of patterns to generate a plurality of set sequences, the set sequences each being a sequence of one or more sets, the sets each including at least one semi-finished product as at least one element thereof.

The calculating unit assigns, for each of the set sequences, the sets included in the set sequence to different ones of the processing devices so that processing of all the semi-finished products belonging to the set sequence are completed fastest, and finds the set sequence that completion time is fastest.

The determining unit determines that a top set in the set sequence found by the calculating unit is processed by the processing device assigned by the calculating unit.

The dividing unit uses the patterns satisfying that
a size of one set is not less than a smallest number of minimum numbers of semi-finished products that the processing devices can process at one time and is not more than a largest number of maximum numbers of semi-finished products that the processing devices can process at one time, and
sizes of respective top sets in the set sequences cover all values in a range from the minimum number to the maximum number.

Hereinbelow, the present embodiment will be described with reference to the drawings.

Figure 1:
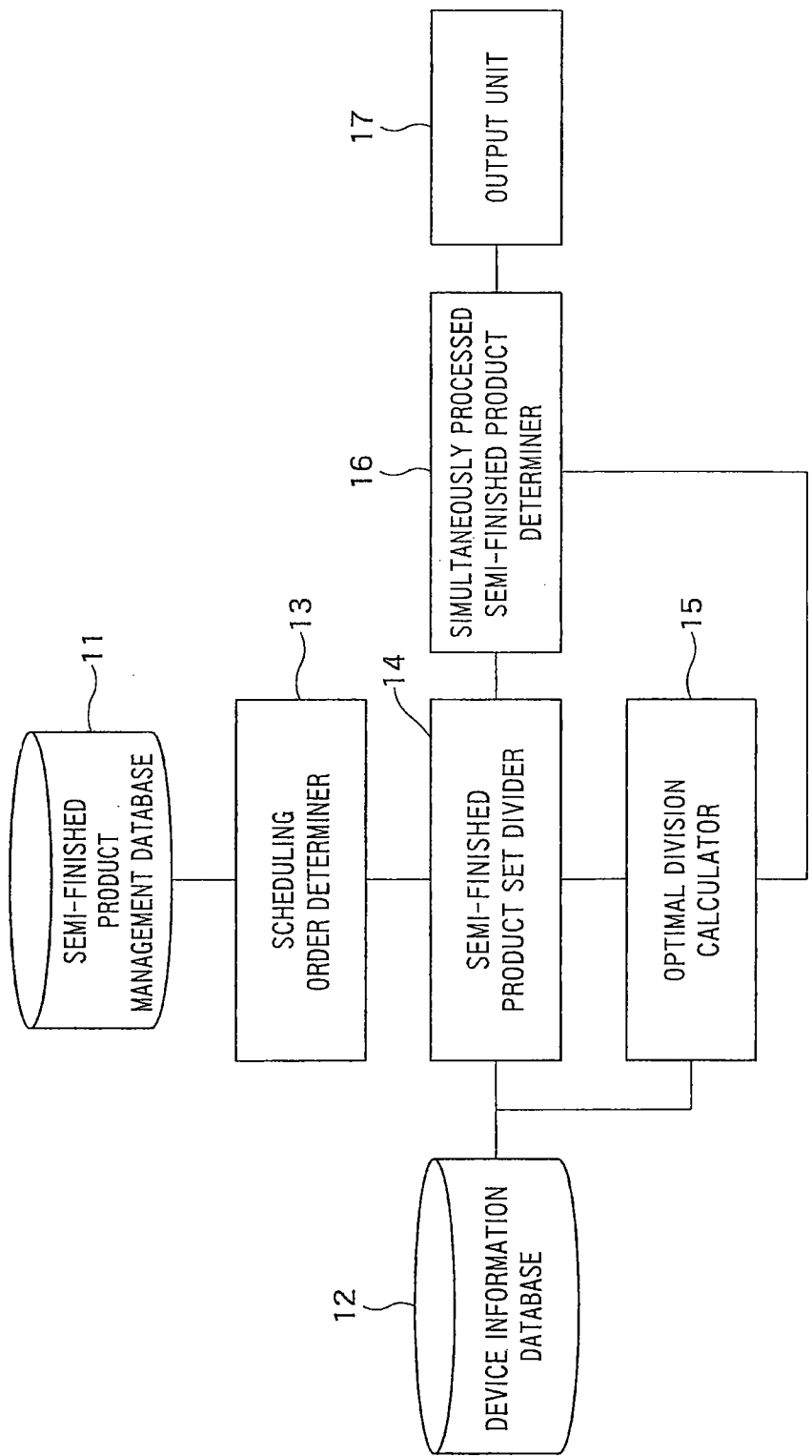
FIG. 1 is a block diagram showing a configuration of a device according to an embodiment.

FIG. 1 is a block diagram showing a batch-processing scheduling device according to the present embodiment.

A semi-finished product management database 11 stores and manages information including an available time and an expiration limit of each of semi-finished products.

A device information database 12 is a database which stores and manages device information on processing devices which process semi-finished products. The device information includes information such as the number of semi-finished products that devices can simultaneously (i.e., at one time) process, a time taken for processing, and the amount of use energy.

A scheduling order determiner 13 specifies semi-finished products which are scheduling targets based on the semi-finished product management database 11, and determines a scheduling order of the specified semi-finished products.

A semi-finished product set divider 14 extracts a predetermined number of semi-finished products from a head out of the semi-finished products arrayed in the scheduling order. The semi-finished product set divider 14 then divides a sequence of the extracted semi-finished products into one or more sets according to a plurality of patterns to generate set sequences each corresponding to each of respective patterns. The set sequence each is a sequence of one or more sets, and the set each includes at least one semi-finished product as an element.

In each set sequence, a number of elements included in one set (i.e., a size of one set) is not less than a smallest number of minimum numbers of semi-finished products that all the processing devices can simultaneously process and is not more than a largest number of maximum numbers of semi-finished products that all the processing devices can simultaneously process. In short, the minimum number of elements in one set is a minimum number of simultaneously processible semi-finished products among the processing devices, while the maximum number of elements in one set is the maximum number of simultaneously processible semi-finished products among the processing devices.

In the present embodiment, the predetermined number of the semi-finished products to be extracted from the head of the semi-finished products ordered in the scheduling order is assumed to be identical to the maximum number of simultaneously processible semi-finished products, or assumed to be a value preset by a user. However, without being limited thereto, the number of products to be extracted in the present embodiment may be determined by an arbitrary method.

An optimal division calculator 15 assigns, for each of the set sequences corresponding to each of the patterns, the set(s) included in the set sequence to different one(s) of the processing devices so that processing of all the semi-finished products is completed fastest. The optimal division calculator 15 calculates a time at which the processing of all the semi-finished products is completed, for each of the set sequences. The optimal division calculator 15 then specifies a set sequence which completes the processing fastest among the set sequences.

In short, the optimal division calculator calculates a fastest processing completion time for each of the set sequences obtained by the semi-finished product set divider. The optimal division calculator then finds, as the optimal set sequence, a set sequence whose fastest processing completion time is the fastest among all the set sequences.

Alternatively, the optimal division calculator 15 calculates an energy use amount of each of the set sequences, respectively, and finds a set sequence which consumes a least energy amount as the optimal sequence set.

A simultaneously processed semi-finished product determiner 16 performs scheduling of a first (top) set of the optimal set sequence. More specifically, the determiner 16 determines that the semi-finished products included in the top set of the optimal set sequence are processed by a processing device assigned to the top set by the optimal division calculator 15. At this stages, a second set and onward in the optimal set sequence not scheduled but are subjected to next processing performed by the semi-finished product set divider 14.

An output unit outputs a scheduling result determined by the simultaneously processed semi-finished product determiner 16. The scheduling result may be outputted to a display unit, may be transmitted via a wired or wireless network, or may be stored in storage media such as hard disks and memory devices.

Figure 2:
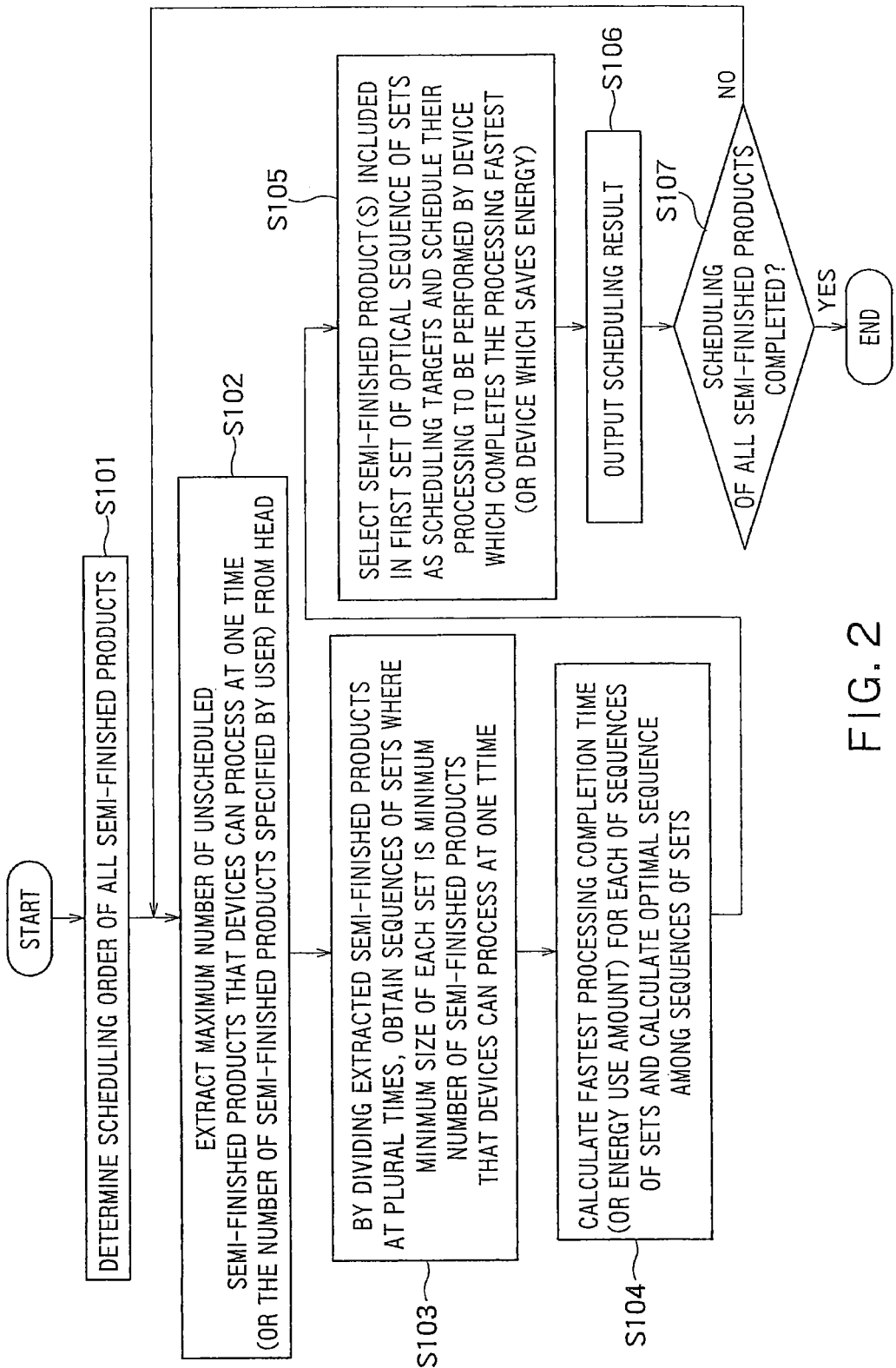
FIG. 2 is a flow chart of operation of the device according to the present embodiment.

Hereinafter, operation of the scheduling device will be described in detail by using concrete examples. An operation flow of the present embodiment is shown in FIG. 2.

It is assumed that there are total two processing devices: one is a batch processing device (referred to as M1) which can simultaneously process one to four semi-finished products; and the other is a device (referred to as M2) which can simultaneously process one semi-finished product. This kind of information on devices is included in the device information database 12.

A description is herein given of an example in which processing of semi-finished products $m_1$, $m_2$, $m_3$, $m_4$, $m_5$, $m_6$, ..., $m_n$ is scheduled. The semi-finished products are not limited to specific products. Any product which becomes a finished product through a plurality of steps, such as semiconductor devices, may be regarded as the semi-finished products.

The time at which each of the semi-finished products becomes available is defined as $t(m_1)$, $t(m_2)$, $t(m_3)$, $t(m_4)$, $t(m_5)$, $t(m_6)$, ..., $t(m_n)$. This information is included in the semi-finished product management database 11.

First, the scheduling order determiner 13 determines a scheduling order of the semi-finished products $m_1$ to $m_n$ (S101). The scheduling order is an order of available time or an order of nearness to a consumption limit when the semi-finished products have the consumption limit. The scheduling order is assumed to be $m_1 \rightarrow m_2 \rightarrow m_3 \rightarrow m_4 \rightarrow m_5 \rightarrow m_6 \rightarrow ... \rightarrow m_n$ to keep generality.

The semi-finished product set divider 14 extracts a predetermined number of unscheduled semi-finished products from the head of semi-finished products whose scheduling order was determined by the scheduling order determiner 13 (S102). In this case, a maximum number of the semi-finished products that the batch processing device can simultaneously process (4 products) are extracted ($m_1 \rightarrow m_2 \rightarrow m_3 \rightarrow m_4$).

The extracted four semi-finished products are divided into one or more sets from the top to form a set sequence (S103). The dividing operation is performed according to a plurality of patterns. The minimum number of elements in one set is 1, which is the smallest number among the numbers of semi-finished products that the respective batch processing devices M1, M2 can simultaneously process. The maximum number of elements in one set is 4, which is the largest number among the numbers of semi-finished products that the respective batch processing devices M1, M2 can simultaneously process.

Since a sequence of the extracted semi-finished products is $m_1 \rightarrow m_2 \rightarrow m_3 \rightarrow m_4$, eight patterns of set sequences are obtained by the dividing operation: [$\{m_1, m_2, m_3, m_4\}$]; [$\{m_1, m_2, m_3\}\{m_4\}$]; [$\{m_1, m_2\}\{m_3, m_4\}$]; [$\{m_1, m_2\}\{m_3\}\{m_4\}$]; [$\{m_1\}\{m_2, m_3, m_4\}$]; [$\{m_1\}\{m_2, m_3\}\{m_4\}$]; [$\{m_1\}\{m_2\}\{m_3, m_4\}$]; and [$\{m_1\}\{m_2\}\{m_3\}\{m_4\}$].

In the above case, the products are divided according to all the patterns which fulfill the conditions of the above-stated minimum number and the maximum number of elements, However, the products may be divided according to the patterns smaller in number than all these patterns. In the dividing operation, the number of elements in the top set in each set sequence obtained by the dividing operation should preferably cover all the values in the range from the minimum number of elements (a minimum number of simultaneously processible semi-finished products) to the maximum number of elements (a maximum number of simultaneously processible semi-finished products). For example, in the following four patterns out of the above eight patterns:

[$\{m_1, m_2, m_3, m_4\}$]; [$\{m_1, m_2, m_3\}\{m_4\}$]; [$\{m_1, m_2\}\{m_3\}\{m_4\}$]; and [$\{m_1\}\{m_2, m_3, m_4\}$], the number of elements in the first set is respectively 4, 3, 2, 1. It can be said, therefore, that these four patterns cover all the values in the range from the minimum number of elements to the maximum number of elements. The number of available set sequences exponentially increases with respect to the maximum number of products that the batch processing devices can simultaneously process. As a consequence, when the maximum number that the batch processing devices can simultaneously process is large, the processing time becomes too long. As a solution, it is possible to enable a user to specify the number of semi-finished products to be extracted from the semi-finished products whose scheduling order was determined by the scheduling order determiner 13.

The optimal division calculator 15 interprets that each set in one set sequence is simultaneously processed by each corresponding one semi-finished product processing device, and specifies the set sequence, among the set sequences, that the processing of all the extracted semi-finished products is completed fastest (S104).

For example, in the case of a set sequence [$\{m_1, m_2\}\{m_3\}\{m_4\}$], first of all, the products $m_1$ and $m_2$ must be processed by the same processing device, and so the products $m_1$ and $m_2$ are to be processed by the device M1. The completion time of this processing is set as $f(\{m_1, m_2\})$. Next, the device which can complete processing of the product $m_3$ fastest is examined. The product $m_3$ is assigned to the device M1 or M2. The completion time of this processing is set as $f(\{m_3\})$. Similarly, the completion time of the processing against the product $m_4$ is set as $f(\{m_4\})$. The fastest completion time of the processing against the set sequence [$\{m_1$, $m_2\}\{m_3\}\{m_4\}]$ is equal to a maximum value (a earliest time) among $f(\{m_1, m_2\})$, $f(\{m_3\})$, and $f(\{m_4\})$.

The optimal division calculator 15 calculates the fastest completion time of the processing in all the dividing patterns. The optimal division calculator finds, as the optimal set sequence, a set sequence which corresponds to the pattern which has the fastest processing completion time. When a plurality of optimal patterns is present, an arbitrary method may be used to select a pattern. For example, it may be considered to select the pattern which has a larger number of elements in the top set. The selection may also be made at random.

In the case of aiming at completing processing with low energy consumption, the energy use amount is calculated instead of the fastest processing completion time in all the patterns, and the pattern with the least energy use amount is found (S104).

When the semi-finished product, which is included in a set constituted of 1 element, such as $m_3$ or $m_4$ in a set sequence $[\{m_1, m_2\}\{m_3\}\{m_4\}]$, is assigned to the processing device, an unused area of the batch processing device (schedule time at which the product can simultaneously be processed together with other semi-finished products) may be used. It is also possible to introduce a mechanism in which a waiting-time parameter w is prepared, and an unused area of the batch processing device is used if the area becomes available in w minutes. In this case, a further effect of processing time reduction can be achieved.

The simultaneously processed semi-finished product determiner 16 selects the semi-finished product(s) included in the first set of the optimal set sequence found by the optimal division calculator 15 as scheduling target(s). The simultaneously processed semi-finished product determiner 16 determines that a processing device assigned to the first set of the optimal set sequence by the optimal division calculator 15 processes the first set (S105).

The output unit 17 outputs a result of assignment performed by the simultaneously processed semi-finished product determiner 16 (S106).

For example, when the optimal set sequence found by the optimal division calculator 15 is $[\{m_1, m_2\}\{m_3\}\{m_4\}]$, the simultaneously processed semi-finished product determiner 16 completes scheduling of two semi-finished products $m_1$ and $m_2$ (assigned to M1). At this stage, the products $m_3$ and $m_4$ are not scheduled. The semi-finished products $m_3 \rightarrow m_4 \rightarrow m_5 \rightarrow m_6 \rightarrow \ldots \rightarrow m_n$ are again applied to the semi-finished product set divider 14. By scheduling the products $m_3$ and $m_4$ in the next turn, it becomes possible to increase the probability of the scheduling which completes processing fast as a whole. For example, by scheduling the second set in the next turn, a more effective schedule may be obtained which can simultaneously process the products $m_3$, $m_4$, and $m_5$. This is one of the points of the present embodiment. The second point is that the maximum size of each set in a set sequence is equal to a largest number of the maximum numbers of semi-finished products that the devices can process (maximum number of simultaneously processible semi-finished products) as described before. In short, one set is assigned to one device without exception. This makes it possible to simplify calculation and to reduce scheduling time.

The above procedures are repeated until scheduling of all the semi-finished products is completed (S107).

Thus, it becomes possible to prepare in a short period of time the schedule which can complete processing of the semi-finished products fast as a whole. It also becomes possible to prepare in a short period of time the schedule which can complete processing of semi-finished products with low electric consumption as a whole. The effect of the present embodiment may be further described as shown below.

If the semi-finished products $m_1$ to $m_n$ are divided according to all the patterns all at once, an ideal schedule which completes processing of the semi-finished products $m_1$ to $m_n$ fastest can be obtained at once. However, as the number of semi-finished products increases, calculation time increases exponentially. It becomes impossible, therefore, to perform scheduling within a realistic time frame. On the contrary, in the present embodiment, only a predetermined number of the semi-finished products is extracted at once from the head of products and is divided according to an optimal dividing pattern. Scheduling is performed only on the top set, and the second set and onward are scheduled in the subsequent turns in a repeated manner. As a result, the amount of one calculation is very small. Even when the calculation is repeatedly performed, the calculation amount increases only linearly, so that scheduling can be performed in short time.

Figure 3:
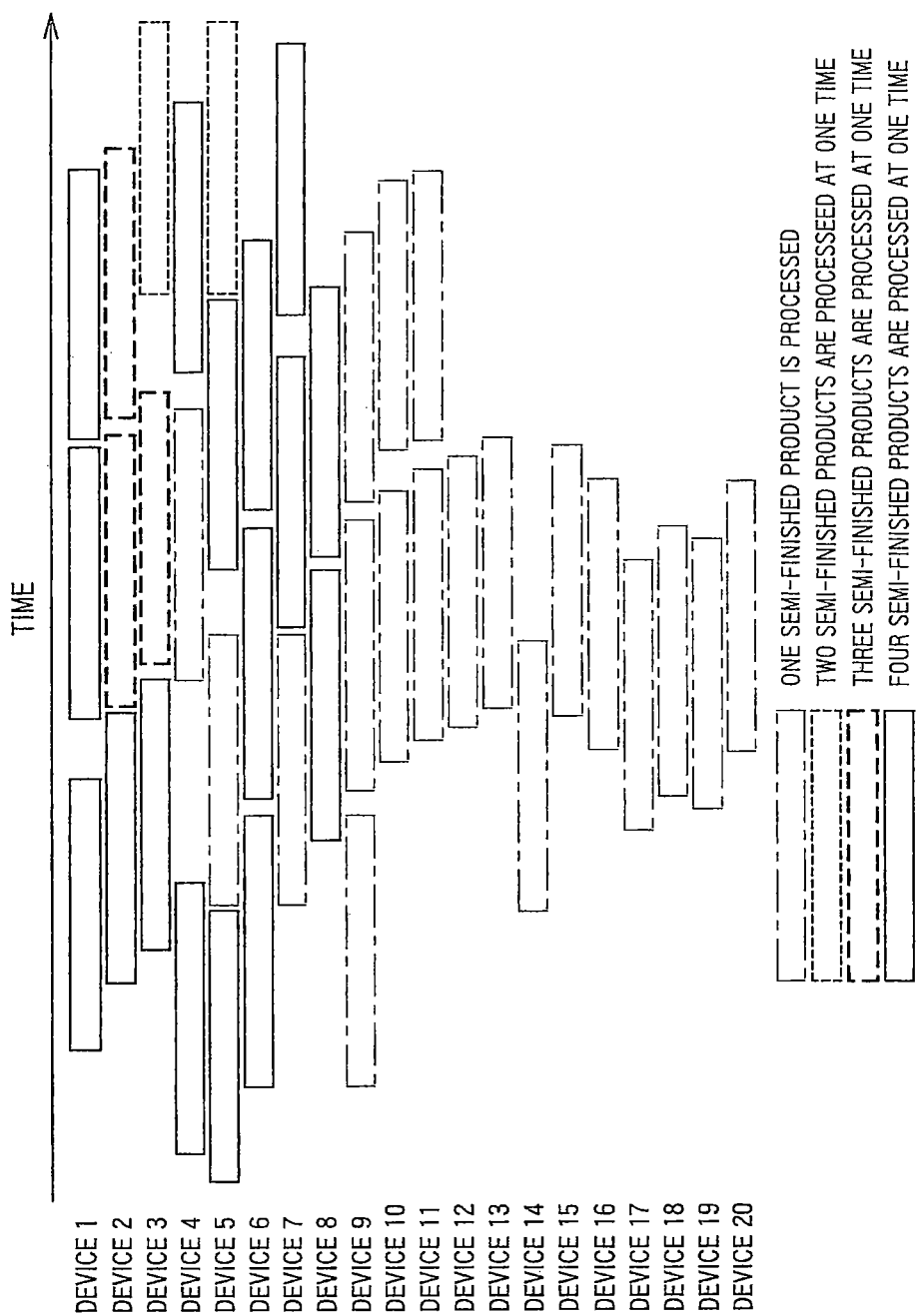
FIG. 3 is a view showing an output result of the device in FIG. 1.

FIG. 3 shows one example of an output result according to the present embodiment.

There are eight batch processing devices (devices 1 to 8) which can simultaneously process one to four semi-finished products and twelve devices (devices 9 to 20) which can process one semi-finished product. An output result obtained when ninety six semi-finished products are scheduled in this setting is shown in FIG. 3. Such scheduling can be completed in, for example, less than 1 second by using the present embodiment., The scheduling device may also be realized using a general-purpose computer device as basic hardware. That is, the elements of the apparatus can be realized by causing a processor mounted in the above described computer device to execute a program. In this case, the device may be realized by installing the above described program in the computer device beforehand or may be realized by storing the program in a storage medium such as a CD-ROM or distributing the above described program over a network and installing this program in the computer device as appropriate. Furthermore, the storage in the device may also be realized using a memory device or hard disk incorporated in or externally added to the above described computer device or a storage medium such as CD-R, CD-RW, DVD-RAM, DVD-R as appropriate.

The invention claimed is:

1. A scheduling device that schedules processing of a plurality of semi-finished products by a plurality of processing devices, comprising:
   a dividing unit configured to select a predetermined number of semi-finished products from a head out of a plurality of the semi-finished products for which scheduling order was determined, and to divide selected semi-finished products according to a plurality of patterns to generate a plurality of set sequences, the set sequences each being a sequence of one or more sets, the sets each including at least one semi-finished product;
   a calculating unit configured to assign, for each of the set sequences, the sets included in the set sequence to different ones of the processing devices so that processing of all the semi-finished products belonging to the set sequence are completed fastest, and find the set sequence that completion time is fastest among the set sequences; and
   a determining unit configured to determine that a top set in the set sequence found by the calculating unit is processed by the processing device assigned by the calculating unit, wherein the dividing unit uses the patterns satisfying that a size of one set is not less than a smallest number of minimum numbers of semi-finished products that the processing devices can process at one time and is not more than a largest number of maximum numbers of semi-finished products that the processing devices can process at one time, and sizes of respective top sets in the set sequences cover all values in a range from the minimum number to the maximum number.

2. The device according to claim 1, wherein
the dividing unit removes the top set in the set sequence found by the calculating unit from the semi-finished products for which scheduling order was determined, and targets the semi-finished products after removal on next processing.

3. The device according to claim 1, wherein
the predetermined number is identical to the largest number of the maximum numbers of semi-finished products that the processing devices can process at one time.

4. The device according to claim 1, wherein
the predetermined number is a number specified by a user.

5. A scheduling device that schedules processing of a plurality of semi-finished products by a plurality of processing devices, comprising:

a dividing unit configured to select a predetermined number of semi-finished products from a head out of a plurality of the semi-finished products for which scheduling order was determined, and to divide selected semi-finished products according to a plurality of patterns to generate a plurality of set sequences, the set sequences each being a sequence of one or more sets, the sets each including at least one semi-finished product;

a calculating unit configured to assign, for each of the set sequences, the sets included in the set sequence to different ones of the processing devices so that energy use amount for processing of all the semi-finished products belonging to the set sequence is minimized, and find the set sequence that minimized energy use amount is least among the set sequences; and a determining unit configured to determine that a top set in the set sequence found by the calculating unit is processed by the processing device assigned by the calculating unit, wherein the dividing unit uses the patterns satisfying that a size of one set is not less than a smallest number of minimum numbers of semi-finished products that the processing devices can process at one time and is not more than a largest number of maximum numbers of semi-finished products that the processing devices can process at one time, and sizes of respective top sets in the set sequences cover all values in a range from the minimum number to the maximum number.

6. The device according to claim 5, wherein
the dividing unit removes the top set in the set sequence found by the calculating unit from the semi-finished products for which scheduling order was determined, and targets the semi-finished products after removal on next processing.

7. The device according to claim 5, wherein
the predetermined number is identical to the largest number of the maximum numbers of semi-finished products that the processing devices can process at one time.

8. The device according to claim 5, wherein
the predetermined number is a number specified by a user.

9. A scheduling method performed using a computer having a processor mounted therein, the processor executing a program that schedules processing of a plurality of semi-finished products by a plurality of processing devices, the program performing the steps of:

selecting a predetermined number of semi-finished products from a head out of a plurality of the semi-finished products for which scheduling order was determined, and dividing selected semi-finished products according to a plurality of patterns to generate a plurality of set sequences, the set sequences each being a sequence of one or more sets, the sets each including at least one semi-finished product;

assigning, for each of the set sequences, the sets included in the set sequence to different ones of the processing devices so that processing of all the semi-finished products belonging to the set sequence are completed fastest, and finding the set sequence that complete time is fastest among the set sequences; and determining that a top set in the set sequence as found is processed by the processing device assigned to the top set, wherein the patterns satisfies that a size of one set is not less than a smallest number of minimum numbers of semi-finished products that the processing devices can process at one time and is not more than a largest number of maximum numbers of semi-finished products that the processing devices can process at one time, and sizes of respective top sets in the set sequences cover all values in a range from the minimum number to the maximum number.

10. A scheduling method performed using a computer having a processor mounted therein, the processor executing a program that schedules processing of a plurality of semi-finished products by a plurality of processing devices, the program performing the steps of:

selecting a predetermined number of semi-finished products from a head out of a plurality of the semi-finished products for which scheduling order was determined, and dividing selected semi-finished products according to a plurality of patterns to generate a plurality of set sequences, the set sequences each being a sequence of one or more sets, the sets each including at least one semi-finished product;

assigning, for each of the set sequences, the sets included in the set sequence to different ones of the processing devices so that energy use amount for processing of all the semi-finished products belonging to the set sequence is minimized, and finding the set sequence that minimized energy use amount is least among the set sequences; and determining that a top set in the set sequence as found is processed by the processing device assigned to the top set, wherein the patterns satisfies that a size of one set is not less than a smallest number of minimum numbers of semi-finished products that the processing devices can process at one time and is not more than a largest number of maximum numbers of semi-finished products that the processing devices can process at one time, and sizes of respective top sets in the set sequences cover all values in a range from the minimum number to the maximum number.

* * * * *